(12) United States Patent
Park et al.

(10) Patent No.: US 7,974,665 B2
(45) Date of Patent: Jul. 5, 2011

(54) DUAL-AXIS ROTATION FOLDER-TYPE MOBILE COMMUNICATION TERMINAL AND HINGE DEVICE THEREOF

(75) Inventors: Jong-Seok Park, Suwon-si (KR); Young-Ki Kim, Yongin-si (KR); Ki-Duk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 993 days.

(21) Appl. No.: 11/838,059

(22) Filed: Aug. 13, 2007

(65) Prior Publication Data
US 2008/0039158 A1 Feb. 14, 2008

(30) Foreign Application Priority Data

Aug. 11, 2006 (KR) .................. 10-2006-0076407
Mar. 29, 2007 (KR) .................. 10-2007-0030844

(51) Int. Cl.
*H04M 1/00* (2006.01)
(52) U.S. Cl. ............... 455/575.3; 455/575.1; 455/575.4; 455/90.3; 455/556.2; 379/433.13
(58) Field of Classification Search ............... 455/575.3, 455/575.1, 90.3; 379/433.12, 433.13; 16/365, 16/366
See application file for complete search history.

(56) References Cited

U.S. PATENT DOCUMENTS

| | | | | |
|---|---|---|---|---|
| 5,797,089 | A * | 8/1998 | Nguyen ....................... | 455/403 |
| 6,839,576 | B2 * | 1/2005 | Aagaard et al. ............. | 455/575.1 |
| 6,865,406 | B2 | 3/2005 | Park | |
| 7,353,050 | B2 * | 4/2008 | Im et al. ...................... | 455/575.3 |
| 7,440,783 | B2 * | 10/2008 | Hyun .......................... | 455/575.3 |
| 7,526,325 | B2 * | 4/2009 | Park et al. .................. | 455/575.3 |
| 7,574,241 | B2 * | 8/2009 | Ahn et al. ................... | 455/575.1 |
| 7,580,518 | B2 * | 8/2009 | Harmon et al. ........... | 379/433.13 |
| 7,640,044 | B2 * | 12/2009 | Won et al. .................. | 455/575.3 |
| 7,697,964 | B2 * | 4/2010 | Hwang ....................... | 455/575.3 |
| 7,764,489 | B2 * | 7/2010 | Kim et al. ................ | 361/679.16 |
| 7,856,256 | B2 * | 12/2010 | Yokota et al. .............. | 455/575.3 |
| 2005/0113156 | A1 | 5/2005 | Park et al. | |
| 2005/0245294 | A1 * | 11/2005 | Gupte et al. ................ | 455/575.1 |
| 2006/0037175 | A1 * | 2/2006 | Hyun ............................. | 16/221 |
| 2007/0123319 | A1 * | 5/2007 | Hwang ....................... | 455/575.1 |
| 2007/0164923 | A1 | 7/2007 | Kanai et al. | |
| 2008/0009330 | A1 * | 1/2008 | Jung et al. .................. | 455/575.3 |

FOREIGN PATENT DOCUMENTS

| | | |
|---|---|---|
| CN | 1622478 | 6/2005 |
| EP | 1 533 984 | 11/2004 |
| KR | 102006009267 | 8/2006 |
| WO | WO 2005/020046 | 3/2005 |
| WO | WO 2005/109838 | 11/2005 |

* cited by examiner

*Primary Examiner* — Sharad Rampuria
(74) *Attorney, Agent, or Firm* — The Farrell Law Firm, P.C.

(57) ABSTRACT

Provided is a dual-axis rotation folder-type mobile communication terminal including a main body, a folder rotatable about a first hinge axis having two positions respectively in a latitudinal direction and a longitudinal direction of the main body to open and close a top face of the main body, and a rotation hinge unit rotatable about a second hinge axis a predetermined degree to change a position of the first axis.

36 Claims, 15 Drawing Sheets

DUAL-AXIS ROTATION FOLDER-TYPE MOBILE COMMUNICATION TERMINAL AND HINGE DEVICE THEREOF

PRIORITY

This application claims priority under 35 U.S.C. §119 to a patent application filed in the Korean Intellectual Property Office on Aug. 11, 2006 and assigned Serial No. 2006-76407 and a patent application filed in the Korean Intellectual Property Office on Mar. 29, 2007 and assigned Serial No. 2007-30844 the contents of which are incorporated herein by reference.

BACKGROUND OF THE INVENTION

1. Field of the Invention

The present invention generally relates to a mobile communication terminal such as a Digital Multimedia Broadcasting (DMB) phone, a game phone, a chatting phone, a camera phone, a Moving Picture Experts Group (MPEG) Layer-3 (MP3) phone, a cellular phone, a Personal Communication Service (PCS) phone, a Personal Digital Assistant (PDA), and a Hand Held Phone (HHP), and in particular, to a dual-axis rotation folder-type mobile communication terminal which selectively changes a folder opening/closing type in order to provide an optimal user interface environment.

2. Description of the Related Art

Generally, a portable communication terminal refers to an electronic apparatus which a user can carry with him/her to perform wireless communication. The wireless communication may be voice communication, message transmission, file transmission, video communication, and a camera function. Additionally, the portable communication terminal serves as a personal agent by performing phone number management and personal schedule management.

In consideration of portability, designs of such portable communication apparatuses have emphasized not only compactness, slimness, excellent gripping property, and lightness, but also multimedia availability, thus having a wider variety of functions, e.g., entertainment functions including game services. In particular, future portable communication terminals are expected to incorporate greater multi-functionality and multi-purpose utilization including video communication, game, Internet, and camera functions as well as a voice communication function.

Conventional portable communication terminals may be classified according to their appearance in consideration of portability and convenience in use, such as bar-type communication terminals and folder-type communication terminals. The bar-type portable communication terminal has a single housing shaped like a bar in which data input/output devices, and transmission/reception devices are mounted. The folder-type portable communication terminal has a folder coupled to a single bar-shaped housing by a hinge device in such a manner that the folder can be rotated in order to be folded towards and unfolded away from the housing.

For example, in a folder-type mobile communication terminal, a folder is rotatably coupled to a main body by a hinge unit, keys are disposed in the main body, and a display unit is disposed in the folder in the folder-type mobile communication terminal, contributing to miniaturization and portability. A folder-type portable communication terminal is disclosed in U.S. Pat. No. 6,865,406, commonly assigned to the assignee of the present application. In the disclosed folder-type portable communication terminal, a camera lens housing is mounted in a hinge unit.

In the conventional mobile communication terminal, inconvenience may be negligible in a data input operation and a displayed data check operation in a phone mode like voice communication or text message transmission. However, in multimedia environments, the promptness or accuracy of a data input operation such as key pressing is degraded in a game mode and a wide screen cannot be provided in a display unit. The promptness and accuracy of key manipulation are more important in the game mode than in any other modes. In particular, key manipulation using both hands instead of one hand is crucial for improving promptness and accuracy.

Of course, the foregoing problems can be solved by increasing the size of the mobile communication terminal, mounting a wide display unit, and disposing more keys; each of which goes against the miniaturization trend and causes inconvenience in carrying.

Therefore, there is a need for a folder-type mobile communication terminal that provides convenience in use in a QWERTY mode for inputting complex data as well as in a phone mode without size increase.

SUMMARY OF THE INVENTION

It is, therefore, an object of the present invention to provide a mobile communication terminal that provides convenient use by allowing a user to select a folder opening/closing state according to mode conversion.

It is another object of the present invention to provide a mobile communication terminal in which a hinge unit can move with a single swing operation to allow a folder opening/closing state to be easily changed, thereby providing convenience in a data input operation.

It is another object of the present invention to provide a mobile communication terminal, in which a stopper member for restricting a swing is provided in a hinge unit, thereby facilitating opening/closing of a folder.

According to one aspect of the present invention, there is provided a mobile communication terminal including a main body, a folder rotating about a first hinge axis positioned in a longitudinal direction or a latitudinal direction of the main body to open or close a top face of the main body, and a rotation hinge unit rotatable about a second hinge axis perpendicular to the main body in a closed state.

According to another aspect of the present invention, there is provided a mobile communication terminal including a main body including at least one key and a first curvature region, a folder including at least one display unit and a second curvature region, and rotating about a first hinge axis positioned in a longitudinal direction or a latitudinal direction of the main body to be folded to or unfolded from the main body, and a rotation hinge unit connecting the folder to the main body so that the folder rotates in a direction towards or away from the main body and swings along the first curvature region and the second curvature region to be positioned in a first side of the main body or in a second side that is adjacent to the first side.

According to further another aspect of the present invention, there is provided a mobile communication terminal including a data input device including a first curvature region, a data output device including a second curvature region and moving with respect to a hinge axis positioned in a longitudinal direction or a latitudinal direction of the data input device to be folded to or unfolded from the data input device, and a rotation hinge unit connecting the data output device to the data input device so that the data output device rotates in a direction towards or away from the data input device, and the rotation unit swings along the first curvature region and the second curvature region to be positioned in a first side of the data input device or in a second side that is adjacent to the first side.

According to still another aspect of the present invention, there is provided a hinge device of a dual-axis rotation folder-type mobile communication terminal including a main body, a folder, and a rotation hinge unit having a first hinge unit that swings along the outer circumference of the main body and provides a first hinge axis positioned in a latitudinal or longitudinal direction of the main body according to the swing, a second hinge unit that perpendicularly penetrates top and bottom faces of the main body and top and bottom faces of the folder, and a swing connection member that connects the first hinge unit with the second hinge unit as one body. The second hinge unit includes a first swing hinge unit mounted on the main body, swinging about the first hinge axis, and providing a second hinge axis and a second swing hinge unit mounted on the folder, swinging about the first hinge axis, and providing a third hinge axis, and the first swing hinge unit includes a first hinge member, a second hinge member combined with the first hinge member so as to swing while facing the first hinge member, a wave washer provided between the first hinge member and the second hinge member, enabling the second hinge member to swing while facing the first hinge member, and providing elastic force for enabling the rotation hinge unit to swing, and a stopper member included between the first hinge member and the wave washer and inserted or separated by elastic force of the wave washer in order to enable or restrict a swing of the second hinge member.

According to yet another aspect of the present invention, there is provided a hinge device of a dual-axis rotation folder-type mobile communication terminal including a main body, a folder, and a rotation hinge unit having a first hinge unit that swings along the outer circumference of the main body and provides a first hinge axis positioned in a latitudinal or longitudinal direction of the main body according to the swing, a second hinge unit that perpendicularly penetrates top and bottom faces of the main body and top and bottom faces of the folder, and a swing connection member that connects the first hinge unit with the second hinge unit as one body. The second hinge unit includes a first swing hinge unit mounted on the main body, swinging about the first hinge axis, and providing a second hinge axis and a second swing hinge unit mounted on the folder, swinging about the first hinge axis, and providing a third hinge axis. The second swing hinge unit includes a first hinge member, a second hinge member combined with the first hinge member so as to swing while facing the first hinge member, a swing washer provided between the first hinge member and the second hinge member, enabling the second hinge member to swing while facing the first hinge member, and providing elastic force for enabling the rotation hinge unit to rotate, and a first stopper unit and a second stopper unit included between the first hinge member and the second hinge member and enabling or restricting a swing of the second hinge member by detachment or contact.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness.

As shown in FIGS. 1 through 8, in a mobile communication terminal according to the present invention, a position of a first hinge axis A1 is changed by a swing of a hinge unit 300 and a folder 200 rotates with respect to the first hinge axis A1 positioned in a latitudinal direction or a longitudinal direction of a main body 100 to be folded to or unfolded from the main body 100. The open/closed states of the folder 200 are selectively and forcibly performed by a user according to mode conversion. The folder 200 is folded or unfolded with respect to the first hinge axis A1 in the latitudinal position in FIGS. 1 through 4, and in FIGS. 5 through 8 is folded or unfolded with respect to the first hinge axis A1 in the longitudinal position after the hinge unit 300 rotates 90° about a second hinge axis A2.

More specifically, the mobile communication terminal according to the present invention includes the main body 100, the folder 200 rotatable about the first hinge axis A1 to be folded to or unfolded from the main body 100, and a rotation hinge unit 300 that couples the folder 200 to the main body 100 so that the first hinge axis A1 can be positioned in a longitudinal direction or a latitudinal direction of the main body 100.

The rotation hinge unit 300 is a rotation device that mechanically couples the main body 100 and the folder 200 to each other and provides a semi-automatic driving source, together with the first hinge axis A1 and a second hinge axis to be described later. The rotation hinge unit 300 may be disposed in a first side of the main body 100 or the folder 200 or in a second side that is adjacent to the first side. The rotation hinge unit 300 is disposed in the first side of the main body 100 in FIGS. 1 through 4 and is disposed in the second side of the main body 100 in FIGS. 5 through 8.

Figure 3:
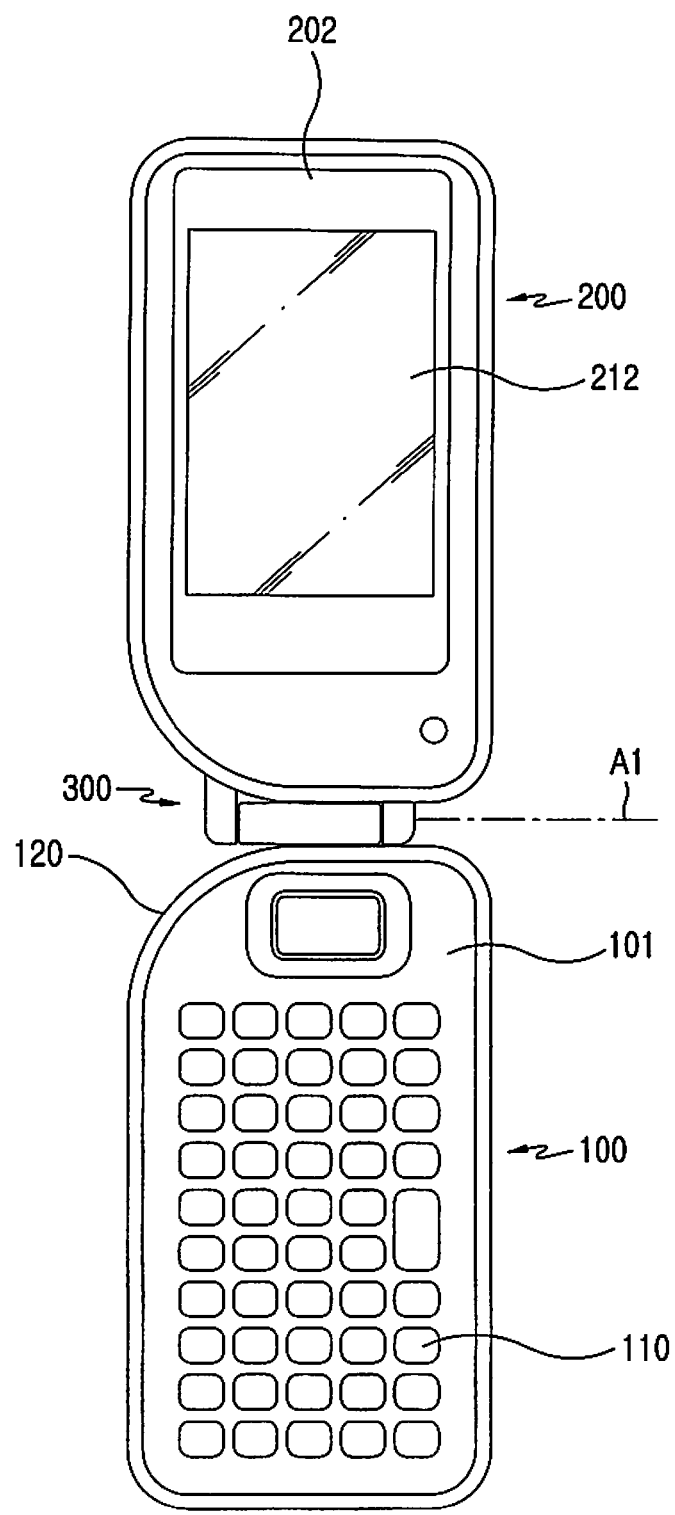
FIG. 3 is a front view showing an open state of the terminal in FIG 1.
Figure 4:
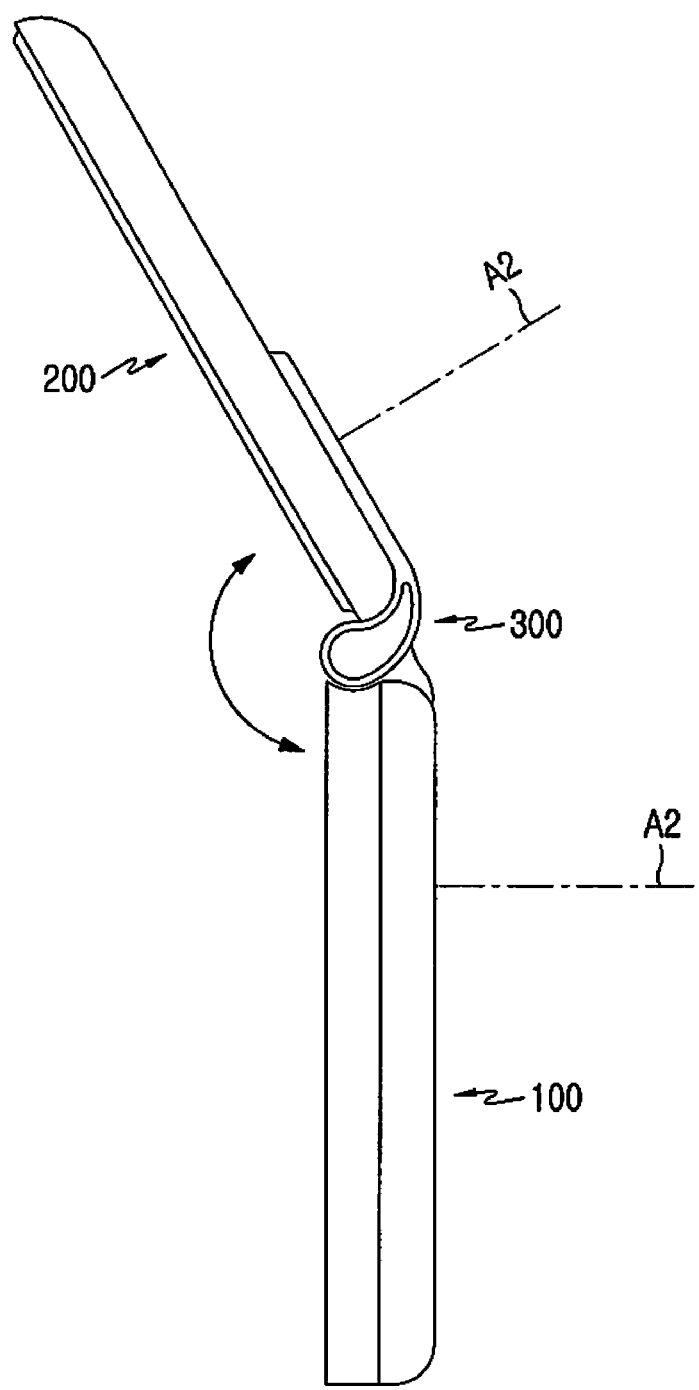
FIG. 4 is a side view of the terminal in FIG. 3 according to the present invention.

As shown in FIG. 3, the main body 100 is shaped like a bar. The main body 100 includes a data input device, specifically, at least one data input key 110 for inputting desired data by being pressed, on its top face 101. The keys 110 are arranged in a QWERTY key layout. The main body 100 has a first curvature region 120 having a first curvature radius at one of its four corners. The main body 100 includes a battery pack 112 at a bottom face 102 of the main body. The batter pack 112 is removed from the bottom face 102 of the main body 100 by a locking knob.

The folder 200 is shaped like a bar. The folder 200 includes a data output device, specifically, at least one of display units 210 and 212. The display units 210 and 212 include a first display unit 210 mounted on an outer face of the folder 200 and a second display unit 212 mounted on an inner face of the folder 200. The first display unit 210 and the second display unit 212 are implemented with a Liquid Crystal Display (LCD). The folder 200 has a second curvature region 220 having a second curvature radius at one of its four corners. The second curvature radius is equal to the first curvature radius, and thus the first curvature region 120 and the second curvature region 220 have the same shape. As will be described later, the first curvature region 120 and the second curvature region 220 keep the rotation hinge unit 300 from being interfered with. In the present invention, the first curvature region 120 and the second curvature region 220 may be formed at at least two corners without being limited to a corner of the main body 100 and a corner of the folder 200. Although the rotation hinge unit 300 swings counter-clockwise from FIG. 1 to FIG. 5, it may also swing clockwise by changing position of the curvature regions.

Figure 1:
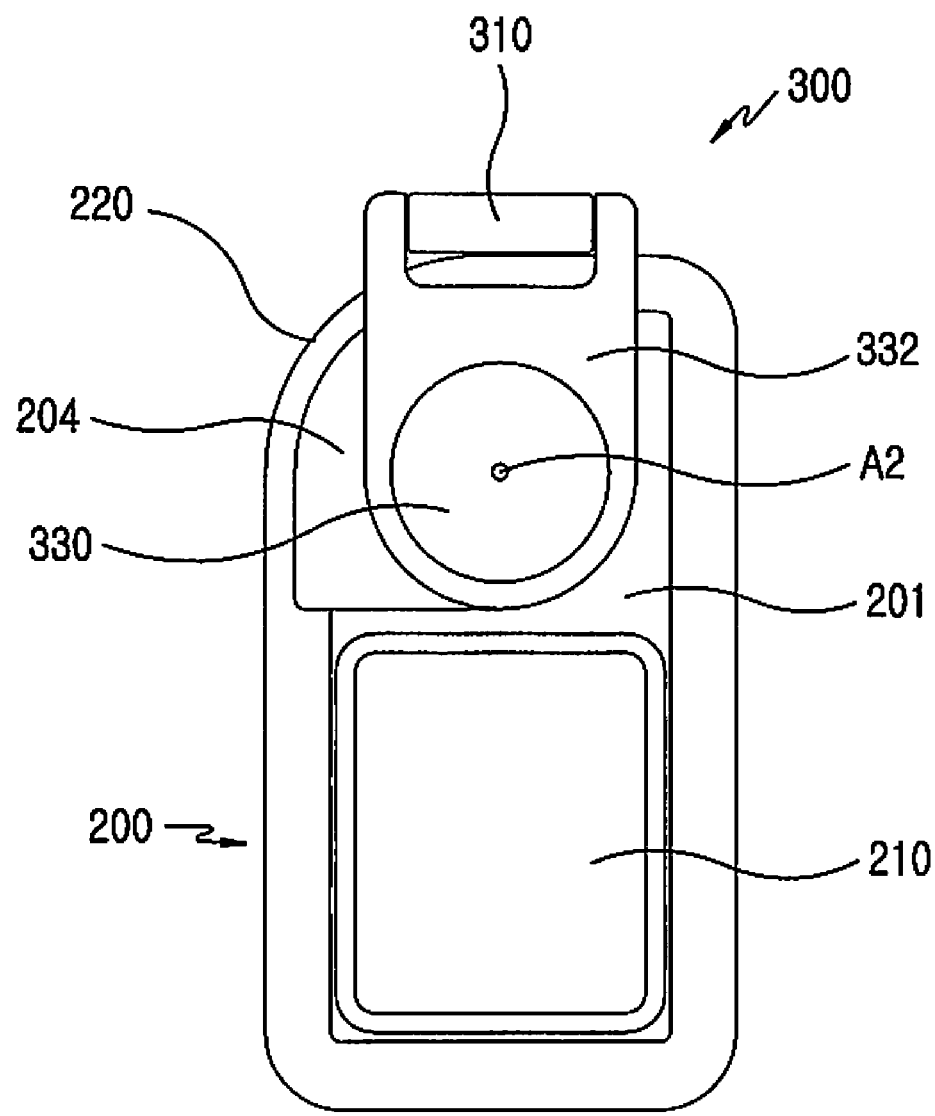
FIG. 1 is a front view of a dual-axis rotation folder-type mobile communication terminal in a closed state and a first hinge axis positioned in a latitudinal direction according to the present invention.
Figure 2:
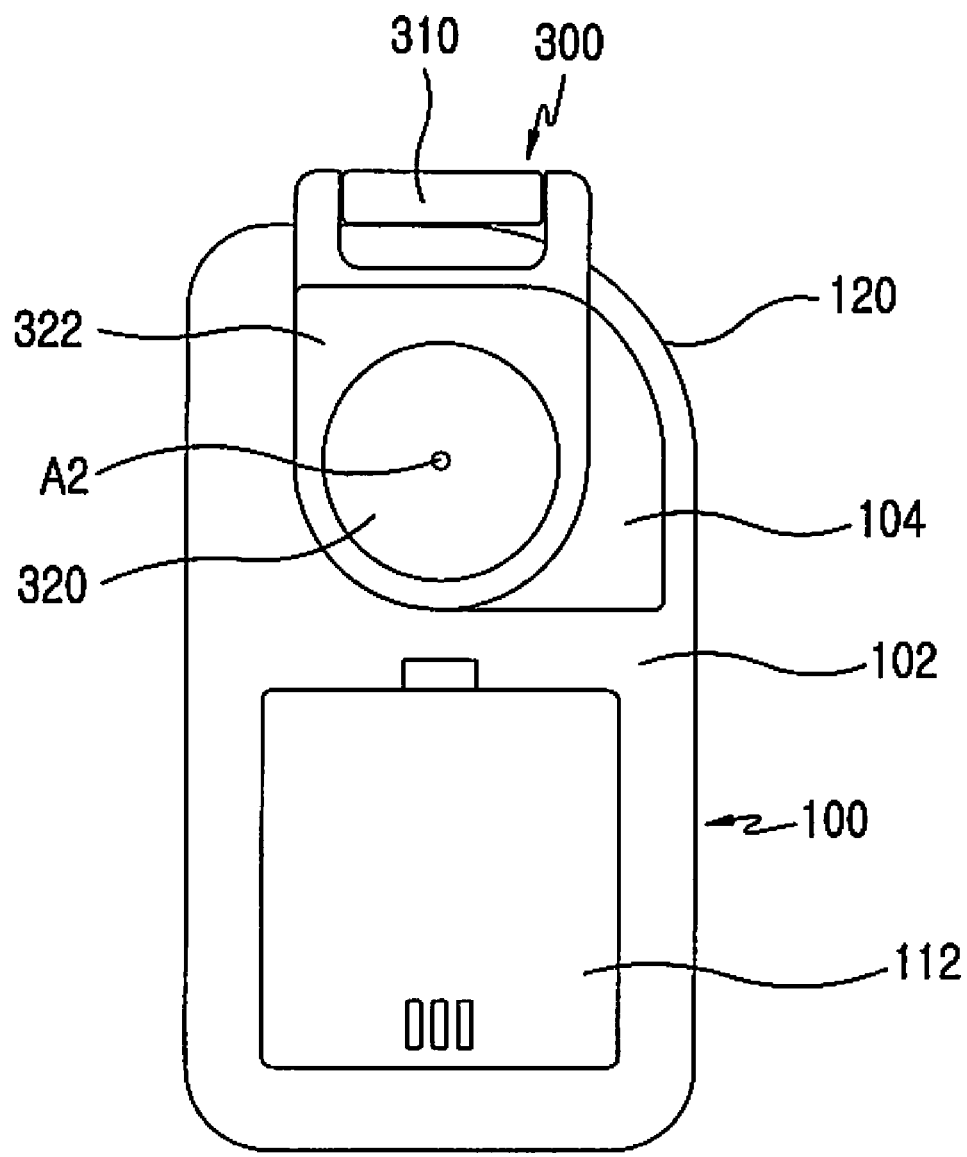
FIG. 2 is a rear view of the terminal in FIG. 1 according to the present invention.

As shown in FIGS. 1 and 2, the rotation hinge unit 300 includes a first hinge unit 310 for providing the first hinge axis A1 that can be positioned in a latitudinal direction (see FIG. 1) or a longitudinal direction (see FIG. 5) of the main body 100, second hinge units 320 and 330 for providing a second hinge axis A2 that penetrates the top face 101 and the bottom face 102 of the main body 100 and a top face 201 and a bottom face 202 of the folder 200, a first swing connection member 322 for connecting the first hinge unit 310 with the second hinge unit 320 as one body, and a second swing connection member 332 for connecting the first hinge unit 310 with the second hinge unit 330 as one body. The rotation hinge unit 300 extends to sides of the main body 100 and the folder 200, on the top face 201 of the folder 200 and to the bottom face 102 of the main body 100.

The first hinge unit 310 provides a semi-automatic opening/closing force of the folder 200. However, the opening/closing force may also be manual or automatic. The second hinge units 320 and 330 are mounted on the bottom face 102 of the main body 100 and on the top face 201 of the folder 200, respectively. The second hinge units 320 and 330 provide a semi-automatic driving source for swing of the first hinge unit 300. The driving source may also be manual or automatic. The first hinge unit 310 is spaced apart from the first curvature region 120 of the main body 100 and from the second curvature region 220 of the folder 200.

The first swing connection member 322 swings while facing the bottom face 102 of the main body 100 and the second swing connection member 332 swings congruently while facing the top face 201 of the folder 200. One end portion of the first swing connection member 322 is connected to the first hinge unit 310 and the other end portion of the first swing connection member 322 is connected to the first hinge module 320. One end portion of the second swing connection member 332 is connected to the first hinge unit 310 and the other end portion of the second swing connection member 332 is connected to the second hinge module 330.

The first hinge unit 310 swings along the outer circumferences of the first curvature region 120 and the second curvature region 220 while maintaining constant distances from the first curvature region 120 and the second curvature region 220. In other words, the first curvature region 120 and the second curvature region 220 are provided to keep the first hinge unit 310 from being interfered with.

Figure 6:
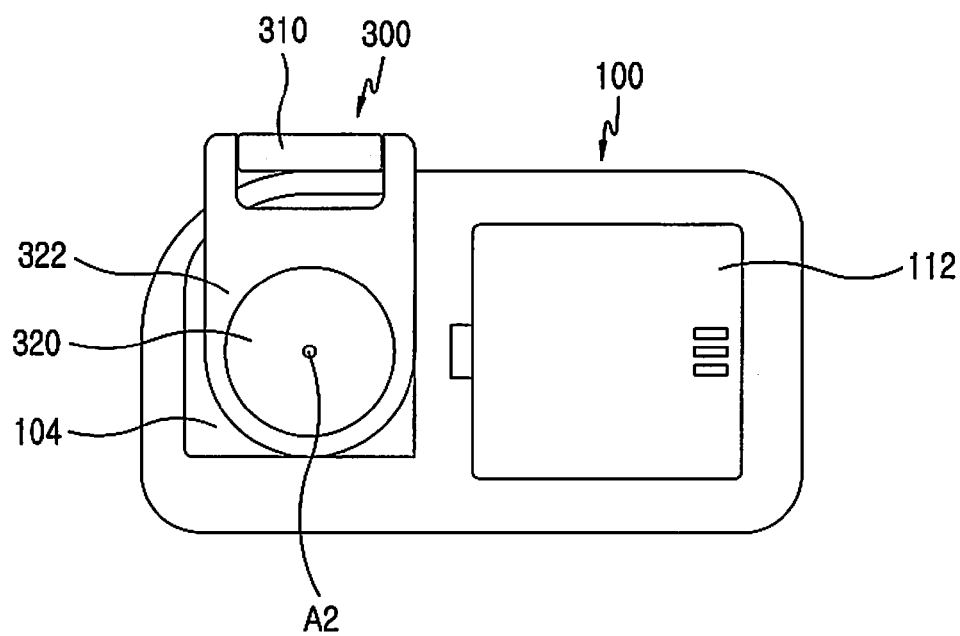
FIG. 6 is a rear view of the terminal in FIG. 5 according to the present invention.

As shown in FIGS. 2 and 6, a first moving recess 104 that is recessed to a predetermined depth for rotation of the rotation hinge unit 300, specifically, of the first swing connection member 322, is formed in the bottom face 102 of the main body 100 in which the first curvature region 120 is positioned.

Figure 5:
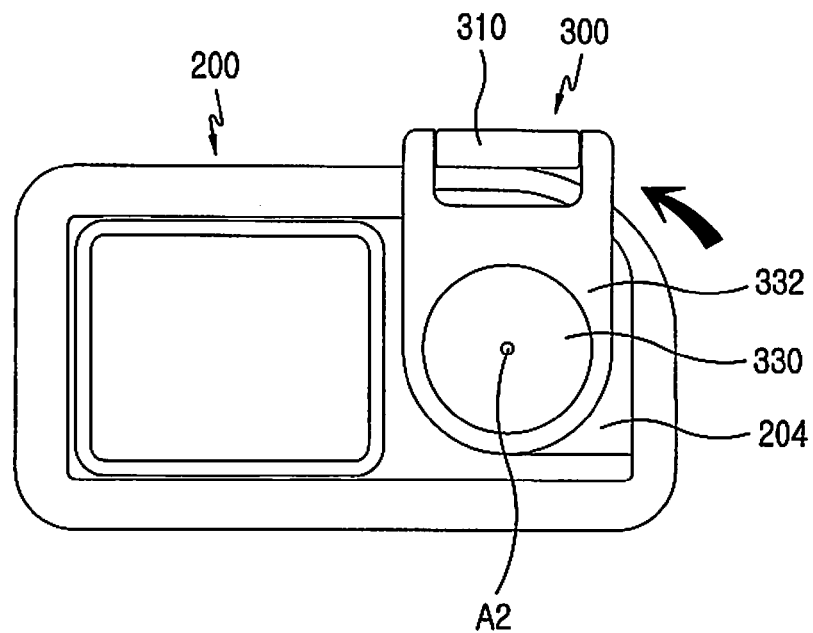
FIG. 5 is a front view of a closed state of a dual-axis rotation folder-type mobile communication terminal in which a rotation hinge unit according to the present invention is swung 90° about a second hinge axis A2 to position the first hinge axis A1 in a longitudinal direction.

As shown in FIGS. 1 and 5, a second moving recess 204 that is recessed to a predetermined depth for rotation of the rotation hinge unit 300, specifically, of the second swing connection member 332, is formed in the top face 201 of the folder 200 in which the second curvature region 220 is positioned. The first moving recess 104 and the second moving recess 204 are shaped like a fan.

It is assumed that the user uses the mobile communication terminal as a general folder-type mobile communication terminal in a first state shown in FIGS. 1 through 4. In this first state, the user can conveniently use the mobile communication terminal in a phone mode. In a second state as shown in FIGS. 5 through 8, the user can conveniently use a Digital Multimedia Broadcasting (DMB) mode, a game mode, and a QWERTY mode.

The operation of a hinge device of a dual-axis rotation folder-type mobile communication terminal according to an exemplary embodiment of the present invention will be described in detail with reference to FIGS. 9 to 18.

Figure 9:
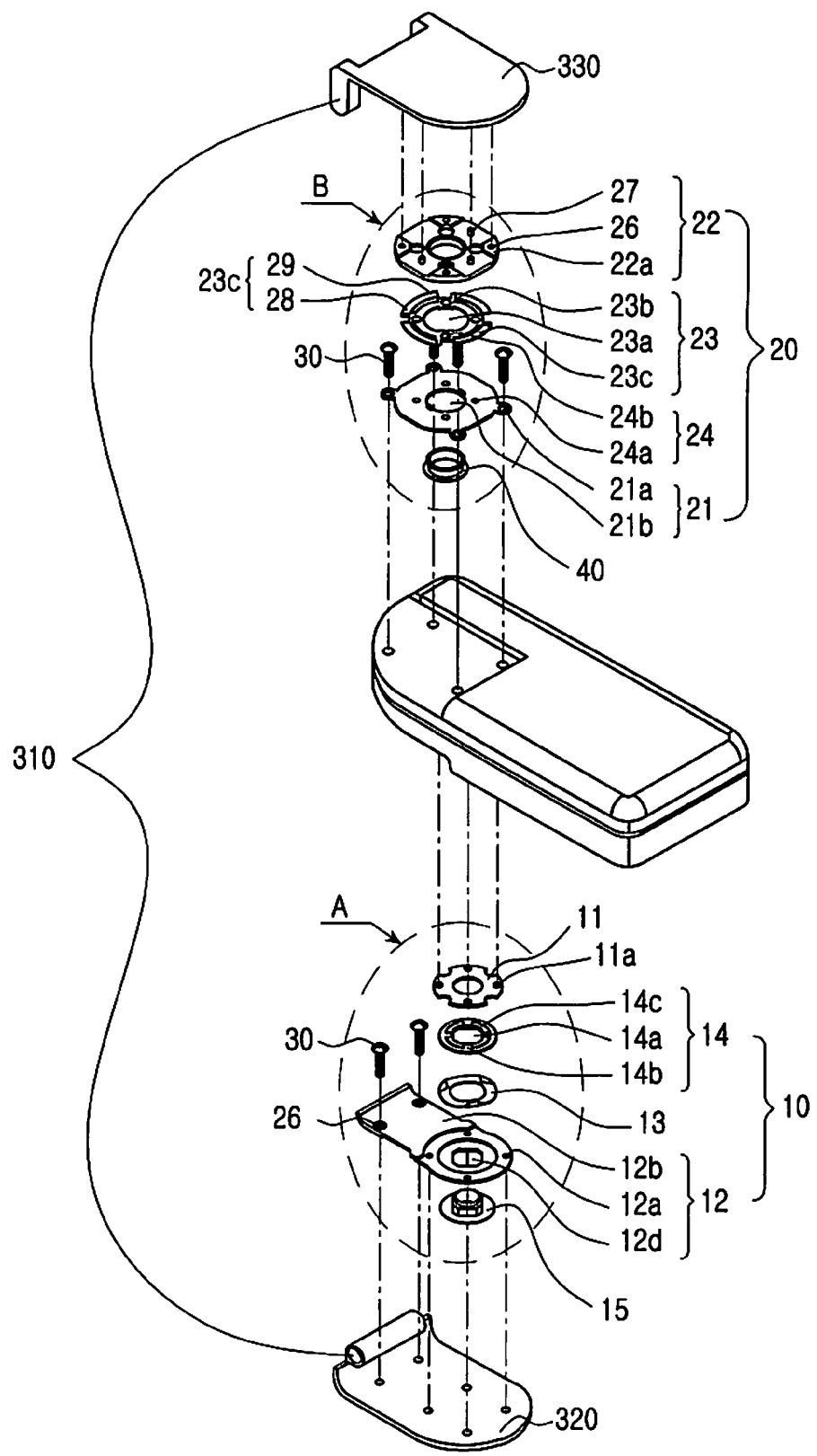
FIG. 9 is an exploded perspective view of a hinge device of a dual-axis rotation folder-type mobile communication terminal according to the present invention.

As shown in FIG. 9, a hinge device of a dual-axis rotation folder-type mobile communication terminal according to an exemplary embodiment of the present invention includes a main body 100, a folder 200, and a rotation hinge unit 300. The rotation hinge unit 300 includes a first hinge unit 310, second hinge units 320 and 330, and a swing connection member. The first hinge unit 310 swings along the outer circumference of the main body 100, and provides a first hinge axis A1 positioned in a latitudinal direction or a longitudinal direction of the main body 100 according to the swing. The second hinge units 320 and 330 perpendicularly penetrate top and bottom faces of the main body 100 and top and bottom faces of the folder 200. The swing connection member connects the first hinge unit 310 with the second hinge units 320 and 330 as one body.

Figure 10:
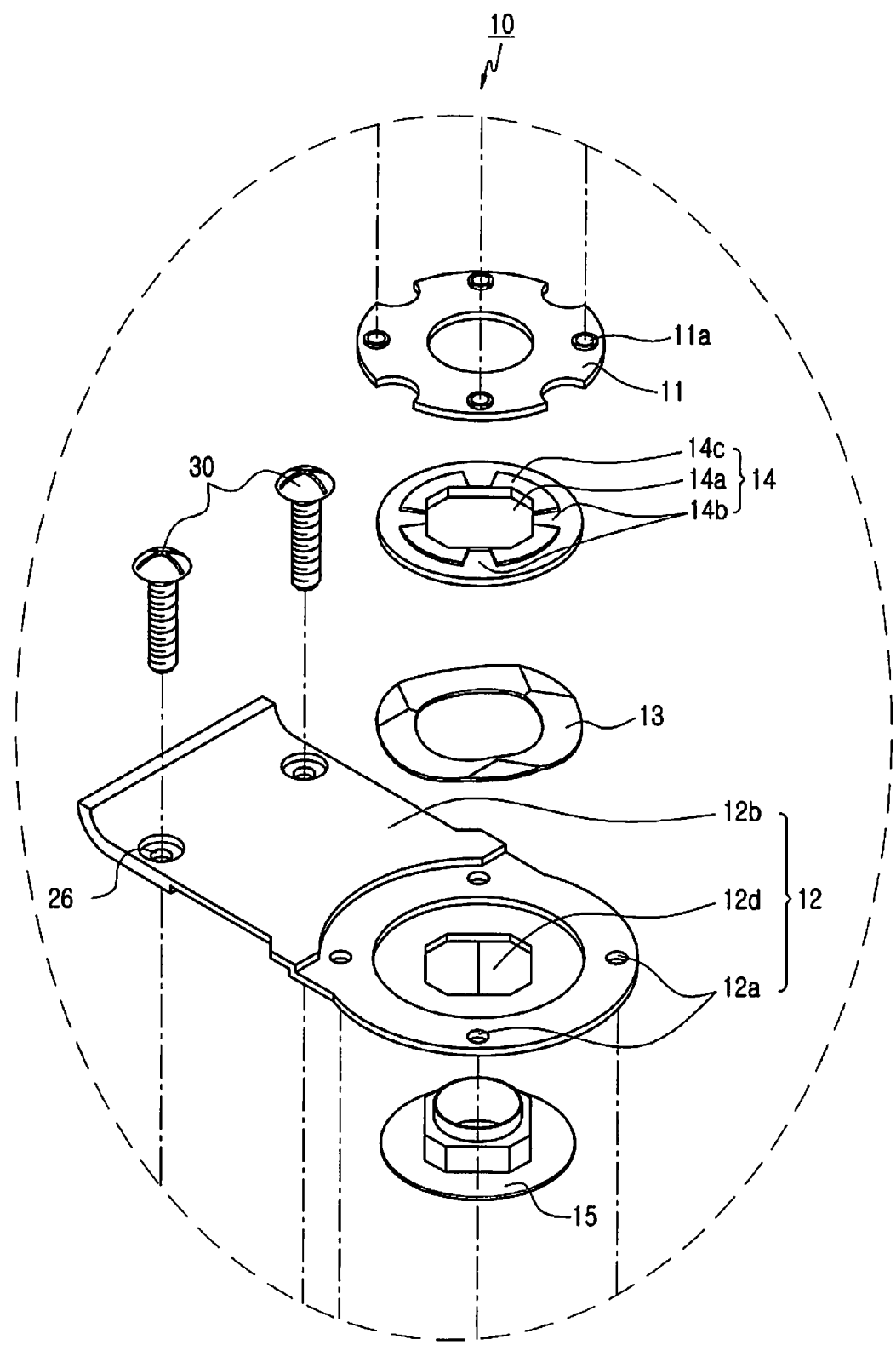
FIG. 10 is an enlarged exploded perspective view of a portion A in FIG. 9.
Figure 13:
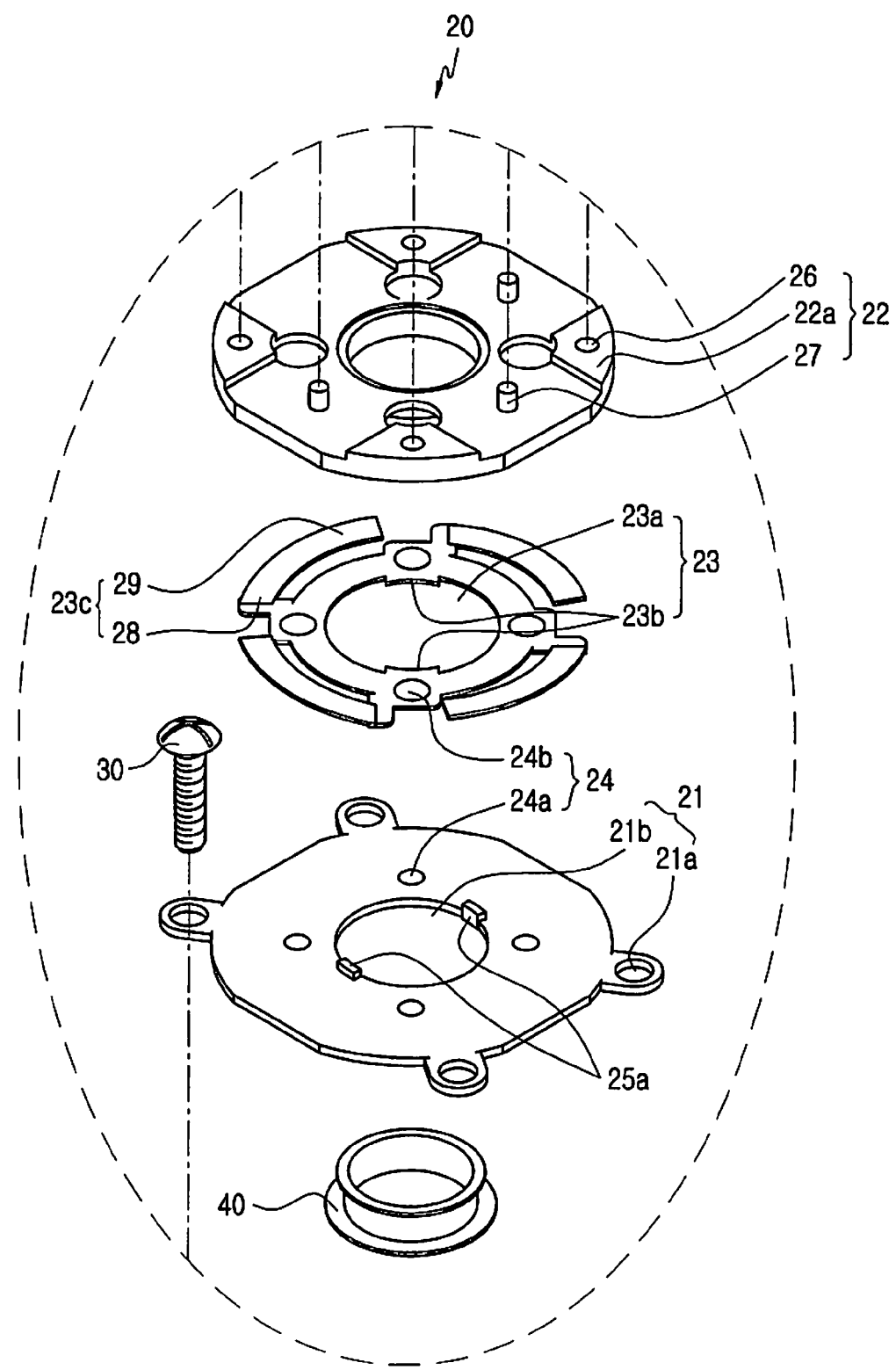
FIG. 13 is an exploded perspective view of a portion B in FIG. 9.

As shown in FIGS. 9, 10, and 13, the second hinge units 320 and 330 include a first swing hinge unit 10 and a second swing hinge unit 20, respectively. The first swing hinge unit 10 includes a first hinge member 11, a second hinge member 12, a wave washer 13, and a stopper member 14. The first hinge member 11 is mounted on an outer side face of the main body 100 in order to support a swing while facing the second hinge member 12. The second hinge member 12 is mounted on the rotation hinge unit 300 in order to be combined with the first hinge member 11 so that it can swing while facing the first hinge member 11. The wave washer 13 is included between the first hinge member 11 and the second hinge member 12 in order to enable the second hinge member 12 to swing while facing the first hinge member 11 and to provide elastic force for enabling the rotation hinge unit 300 to swing. The stopper member 14 is provided between the first hinge member 11 and the wave washer 13 in order to enable or restrict a swing of the second hinge member 12 by being inserted or separated by the elastic force of the wave washer 13.

Figure 11:
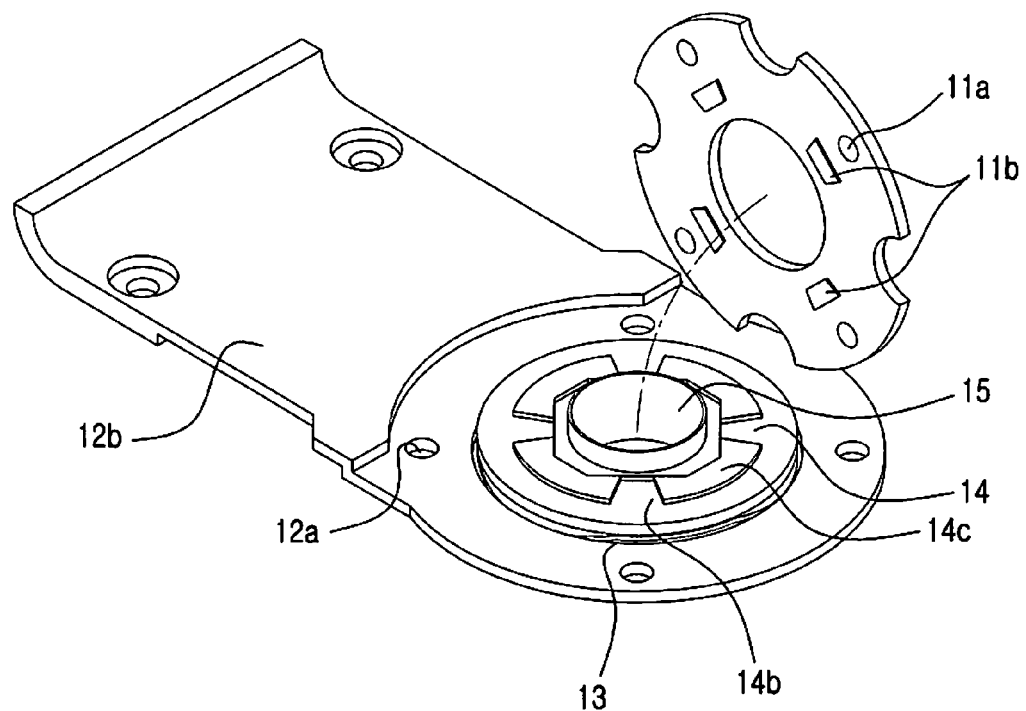
FIG. 11 is a perspective view showing a combining process for a first swing hinge unit of a hinge device of a dual-axis rotation folder-type mobile communication terminal according to the present invention.

As shown in FIGS. 9 and 11, in the first hinge member 11, at least one first engagement unit 11a is formed to be engaged with the main body 100, and at least one insertion/separation unit 11b is formed at equiangular intervals around the center of the first hinge member 11 in order to be inserted or separated according to a swing of a guide stopper groove 14b to be described later. In the second hinge member 12, at least one second engagement unit 12a is formed to be engaged with the rotation hinge unit 300 and a support member 12b is formed around the second hinge member 12 to be engaged with and to be supported by the rotation hinge unit 300.

As shown in FIG. 10, the support member 12b includes at least one screw hole 26 that extends from the circumference of the second hinge member 12 and is engaged with the rotation hinge unit 300.

Figure 12:
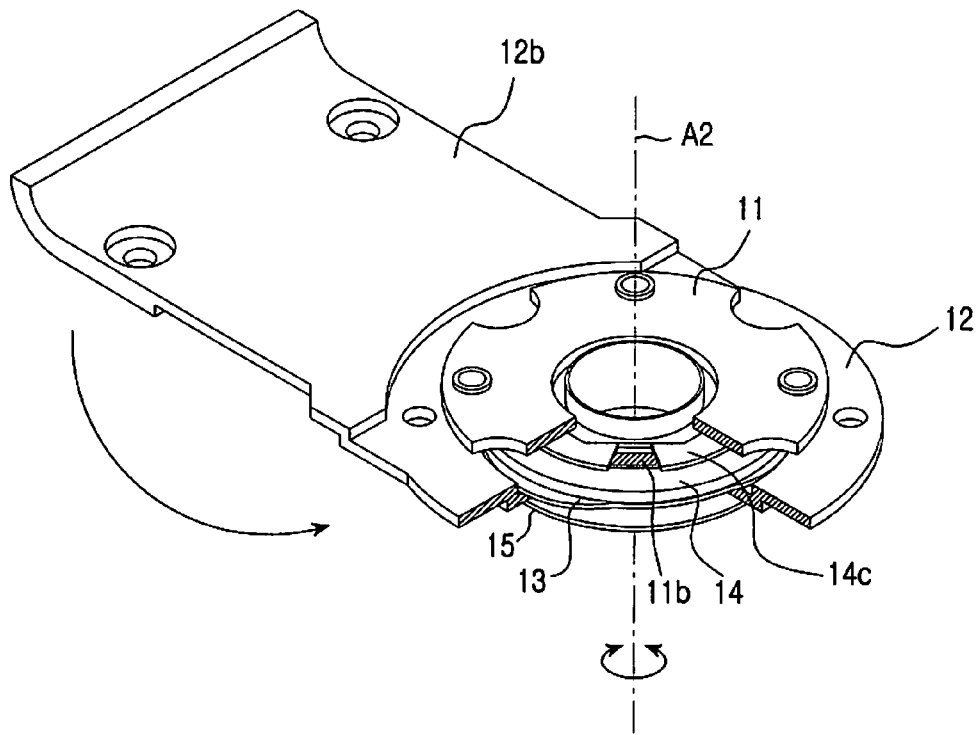
FIG. 12 is a cut perspective view showing a combined state of the first swing hinge unit in FIG. 11.

As shown in FIGS. 9 and 12, a swing bush 15 is provided in order to sequentially combine the first hinge member 11 and the second hinge member 12 and the stopper member 14 with one another and to swing the stopper member 14 together with the second hinge member 12 during a swing of the rotation hinge unit 300. A fixing hole 12d is formed at the center portion of the second hinge member 12 so that it is combined with the swing bush 15 through the swing bush 15 and swings together with the stopper member 14 during a swing of the rotation hinge unit 300.

As shown in FIGS. 10 and 11, the stopper member 14 includes a through hole 14a and at least one guide stopper groove 14b. The through hole 14a is formed at the center portion of the stopper member 14 in order to be combined with the swing bush 15 there through and to swing together with the second hinge member 12. The guide stopper groove 14b is formed at equiangular intervals along the circumference of the through hole 14a in order to restrict swings of the second hinge member 12 and the stopper member 14 by moving in contact with the insertion/separation unit 11b formed on a bottom face of the first hinge member 11 and being inserted into or separated from the insertion/separation unit 11b. The stopper member 14 includes at least one guide face 14c for guiding a swing of the stopper member 14 during a swing of the rotation hinge unit 300.

As shown in FIGS. 9 and 13, the second swing hinge unit 20 includes the first hinge member 21, the second hinge member 22, the swing washer 23, a first stopper unit 24, and a second stopper unit 25. The first hinge member 21 is mounted on an outer side face of the folder 200 in order to support a swing while facing the second hinge member 22. The second hinge member 22 is mounted on the rotation hinge unit 300 in order to be combined with the first hinge member 11 so that it can swing while facing the first hinge member 11. The swing washer 23 is provided between the first hinge member 21 and the second hinge member 22 in order to enable the second hinge member 22 to be swingably combined with the first hinge member 21 while facing the first hinge member 21 and to provide elastic force for enabling the rotation hinge unit 300 to swing. The first stopper unit 24 is provided between the first hinge member 21 and the swing washer 23 in order to enable or restrict a swing of the second hinge member 22 by being inserted or separated according to the elastic force of the swing washer 23. The second stopper unit 25 is provided between the first hinge member 21 and the second hinge member 22 in order to enable or restrict a swing of the second hinge member 22 during a swing of the rotation hinge unit 300 according to contact.

As shown in FIGS. 9 and 13, a swing bush 40 is provided in order to sequentially combine the first hinge unit 310 and the second hinge units 320 and 330 with the swing washer 23 through the swing washer 23. At least one first engagement unit 21a is formed in the first hinge member 21 in order to be engaged with the folder 200. At least one second engagement unit 22a is formed in the second hinge member 22 in order to be engaged with the rotation hinge unit 300. The second engagement unit 22a includes a screw hole 26 and at least one engagement protrusion 27 is formed adjacent to the screw hole 26 in order to be combined with a hole (not shown) formed in the rotation hinge unit 300.

Figure 14:
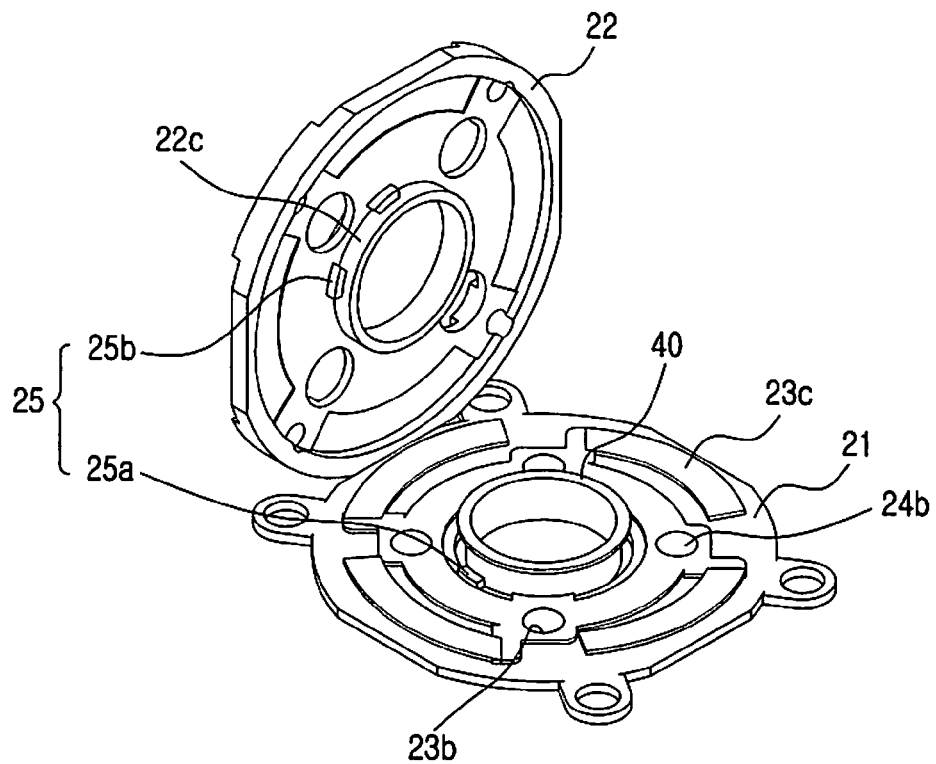
FIG. 14 is a perspective view showing a combining process for a second swing hinge unit of a hinge device of a dual-axis rotation folder-type mobile communication terminal according to the present invention.

As illustrated in FIGS. 13 and 14, the swing washer 23 includes an combining hole 23a, a pair of combination fixing units 23b, and at least one elastic substance 23c. The combining hole 23a is formed at the center portion of the swing washer 23 in order to be combined with the swing bush 40 through the swing bush 40. The combination fixing unit 23b is formed in the inner side of the combining hole 23a in order to be combined with a fixing groove 22c formed in the internal face of the second hinge member 22 and to swing together with the swing washer 23 during a rotation of the second hinge member 22. The elastic substance 23c is formed at equiangular intervals along the outer circumference of the combining hole 23a in order to provide elastic force for enabling the second hinge member 22 to swing. The elastic substance 23c is made of a pan spring, one end of which is a fixing end 28 in order to be fixed in the swing washer 23 and the other end of which is a free end 29 in order to protrude a predetermined height in the direction of a third hinge axis A3 and to provide elastic force during the swing of the second hinge member 22.

Figure 15:
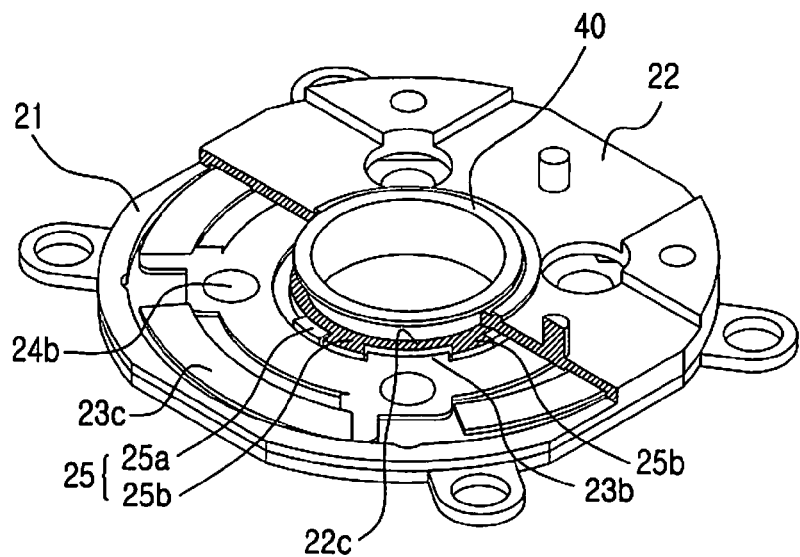
FIG. 15 is a cut perspective view showing a combined state of the second swing hinge unit in FIG. 14.

As shown in FIGS. 13 to 15, the first stopper unit 24 includes at least one stopper protrusion 24a and at least one stopper groove 24b. The stopper protrusion 24a is formed at equiangular intervals along the circumference of the through hole 21b formed in the first hinge member 21 so that the second hinge member 22 and the swing washer 23 swing during a rotation of the rotation hinge unit 300 and at the same time, the stopper groove 23b also swings to be inserted or separated. The stopper groove 24b is formed in a position corresponding to a position of the stopper protrusion 24b and is formed in the swing washer 23 to be inserted into or separated from the stopper protrusion 24a by rotating during swings of the second hinge member 22 and the swing washer 23.

As shown in FIGS. 13 to 15, the second stopper unit 25 includes a pair of contact protrusions 25a and a pair of stopper contact members 25b. The pair of contact protrusions 25a are formed in the through hole 21b of the first hinge member 21 in order to restrict the swing of the rotation hinge unit 300 and the second hinge member 22 according to a contact with the stopper contact members 25b. The stopper contact members 25b are provided in a position that can contact the contact protrusions 25a and is formed in the inner side of the second hinge member 22 in order to contact the contact protrusions 25a by rotating during a swing of the second hinge member 11 and restrict a swing of the second hinge member 11.

As shown in FIGS. 1 to 4, in order to use the dual-axis rotation folder-type mobile communication terminal as a general folder-type mobile communication terminal, a user rotates the folder 200 about the first hinge axis A1 of the first hinge unit 310 provided in the rotation hinge unit 300 in a direction away from the main body 100. In this state, the user can conveniently use the terminal in a phone mode. In order to return the terminal to its home position shown in FIGS. 1 and 2, the user folds the folder 200 onto the main body 100 by rotating the folder 200 about the first hinge axis A1 of the first hinge unit 310 in a direction towards the main body 100.

Figure 7:
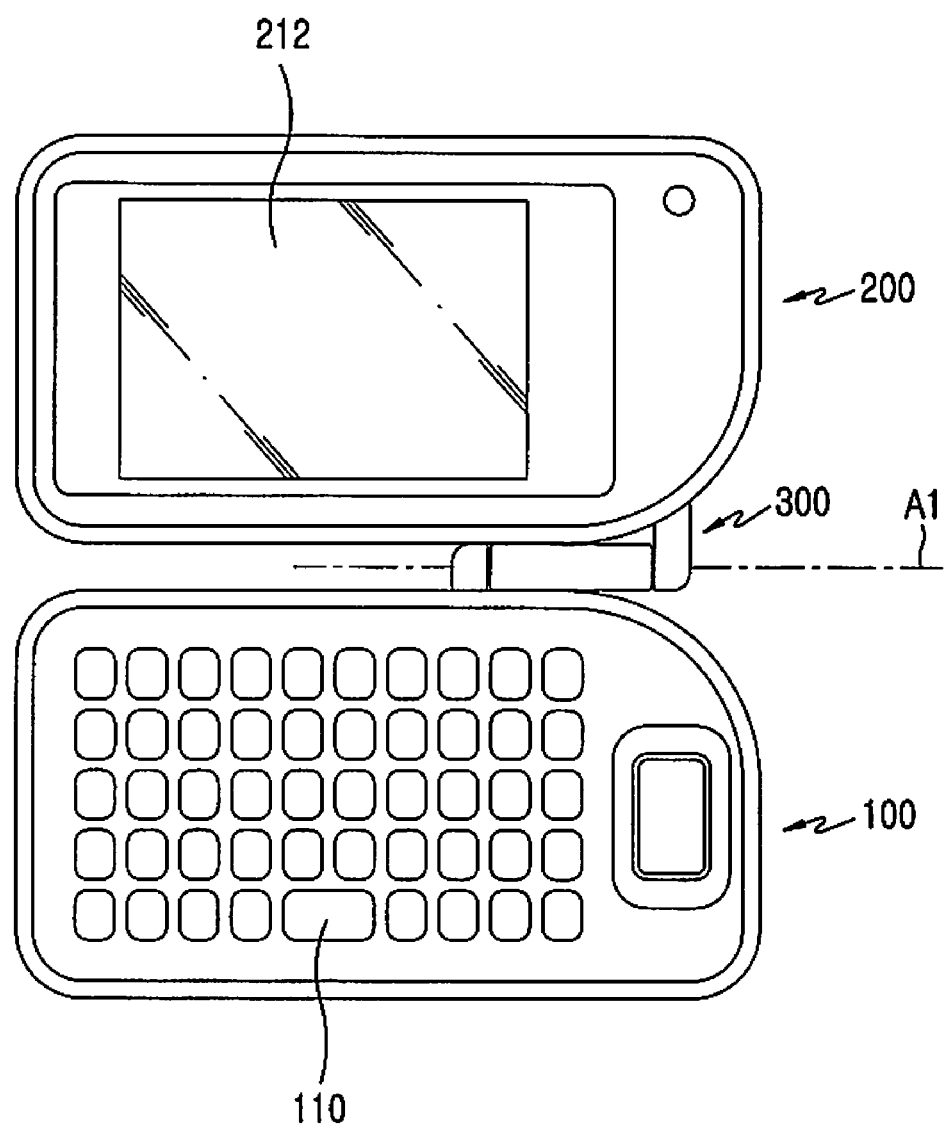
FIG. 7 is a front view showing an open state of the terminal in FIG. 5.
Figure 8:
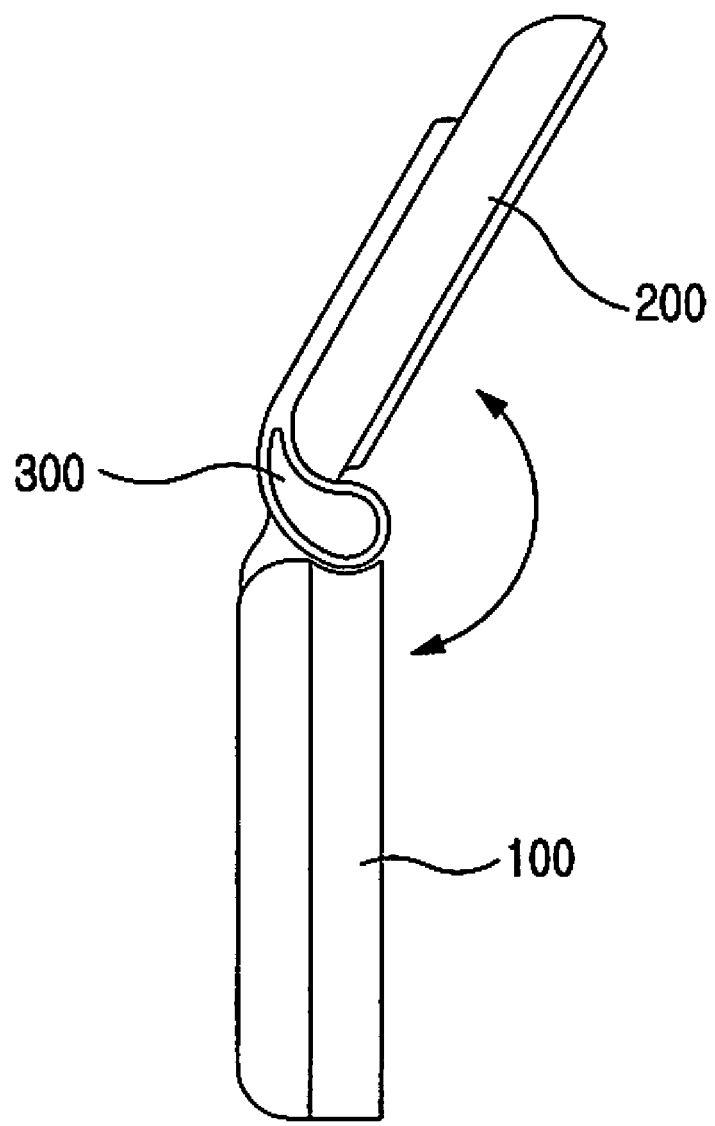
FIG. 8 is a side view of the terminal in FIG. 7 according to the present invention.

As shown in FIGS. 5 to 7, to use the terminal in a DMB mode, a game mode, and a QWERTY mode, the user swings the rotation hinge unit 300 with respect to the second hinge axis A2 and the third hinge axis A3. The first hinge axis A1 of the first hinge unit 310 is positioned from the latitudinal direction to the longitudinal direction.

Figure 16:
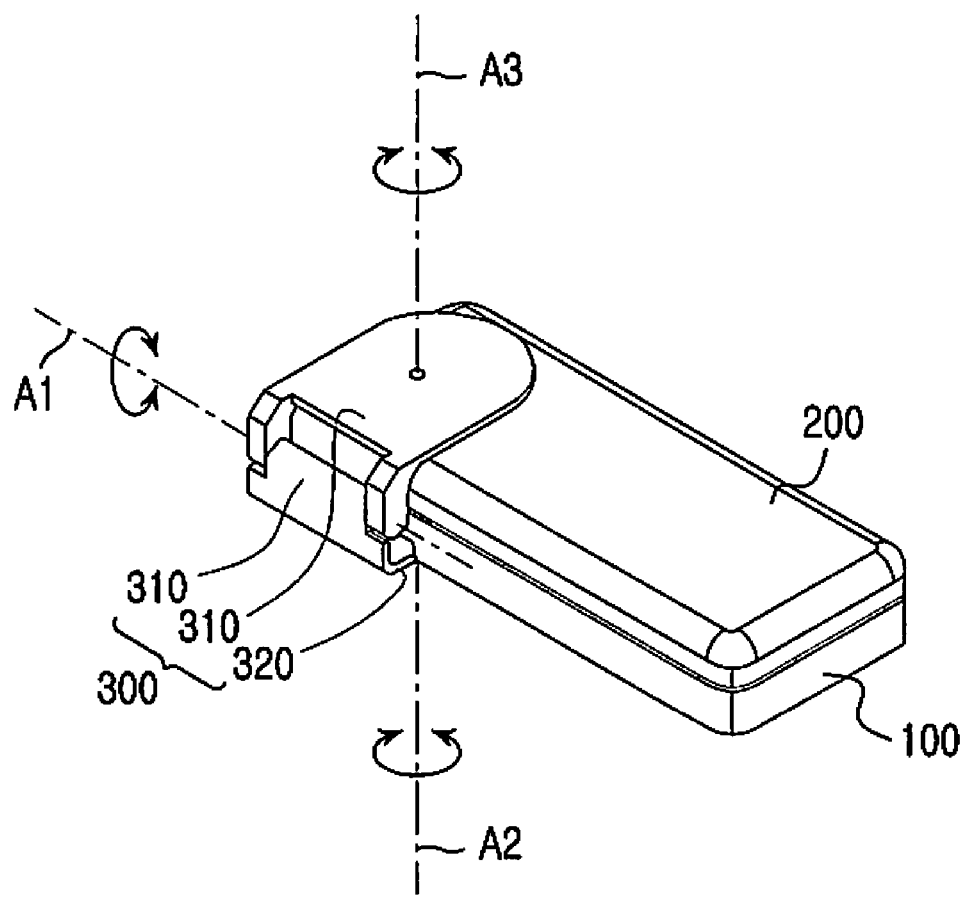
FIG. 16 is a perspective view of a closed state of a dual-axis rotation folder-type mobile communication terminal in which a rotation hinge unit according to the present invention is swung 90°.

Referring to FIGS. 12 and 16, as the rotation hinge unit 300 swings, the second hinge units 320 and 330 swing and at the same time, the first swing hinge unit 10 and the second swing hinge unit 20 of the second hinge units 320 and 330 also swing. The first swing hinge unit 10 is mounted in the main body 100.

Figure 17:
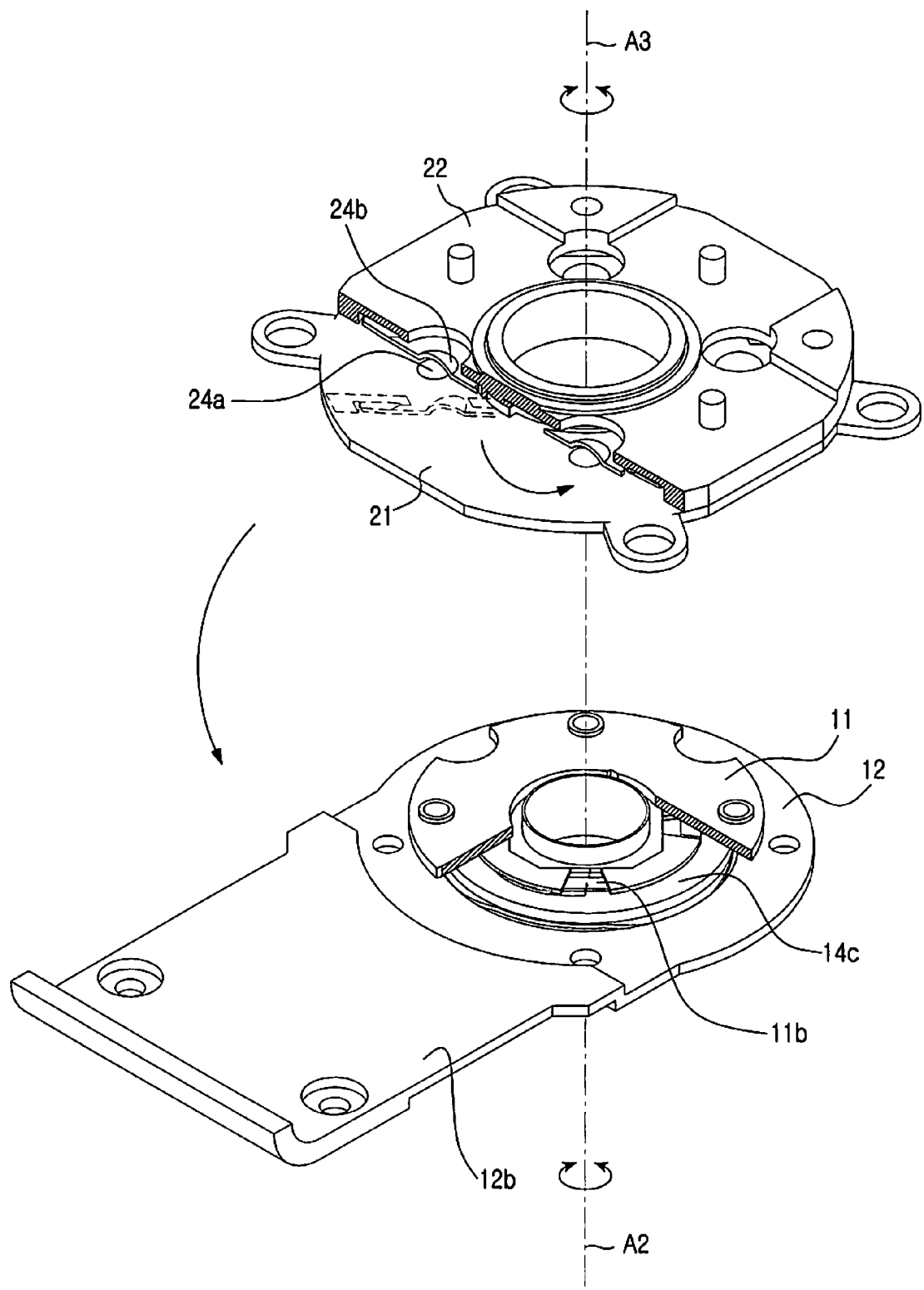
FIG. 17 is a cut perspective view showing a hinge device of a dual-axis rotation folder-type mobile communication terminal according to the present invention is swung 90°.

As shown in FIG. 17, the second hinge unit 12, the stopper member 14, and the wave washer 13 of the first swing hinge unit 10 rotate at the same time. The guide stopper groove 14b of the stopper member 14 also swings and at the same time, the guide face 14c swings. The guide face 14c guides a swing of the stopper member 14.

As shown in FIGS. 12 and 17, the guide stopper groove 14b is separated from the insertion/separation unit 11b of the first hinge member 11 upon swinging. Since the insertion/separation unit 11b is formed at equiangular intervals, the guide stopper groove 14b is inserted to another insertion/separation unit 11b that is provided in a position that allows the stopper member 14 to swing 90°.

As shown in FIG. 12, the stopper member 14 moves up and down about the second hinge axis A2 by elastic force of the wave washer 13, thereby enabling a swing of the guide stopper groove 14b.

As shown in FIGS. 16 and 17, if the guide face 14c swings in contact with the insertion/separation unit 11b during swings of the guide stopper groove 14b and the guide face 14c and then the guide stopper groove 14b and the insertion/separation unit 11b match with each other, the guide stopper groove 14b is inserted into the insertion/separation unit 11b by elastic force of the wave washer 13, thereby restricting a swing of the stopper member 14.

As shown in FIGS. 16 and 17, the second swing hinge unit 20 mounted in the folder 200 also swings about the third hinge axis A3.

The second hinge member 22 and the swing washer 23 then also swing.

Upon swing of the swing washer 23, the stopper groove 14b of the first stopper unit 24 also swings and the stopper groove 14b is inserted to the stopper protrusion 24a formed in the first hinge member 21.

As shown in FIG. 17, since the stopper protrusion 24a is formed at equiangular intervals along the circumference of the through hole 21b of the first hinge member 21, the stopper groove 14b is separated from the stopper protrusion 24a to swing and is inserted to another stopper protrusion 24a, thereby restricting a swing. At this time, the second hinge member 22 stops swinging at 90°.

As shown in FIG. 15, the swing washer 23 provides at least one elastic substance 23c at equiangular intervals and the elastic substance 23c is made of a pan spring.

As shown in FIG. 17, upon swinging of the swing washer 23, the stopper groove 24b of the swing washer 23 also moves and provides elastic force of the pan spring to allow the stopper groove 24b to be separated from the stopper protrusion 24a. The stopper groove 24b and the stopper protrusion 24a are in a semi-spherical form. Thus, the stopper groove 24b can be easily separated from the stopper protrusion 24a during swinging.

Figure 18:
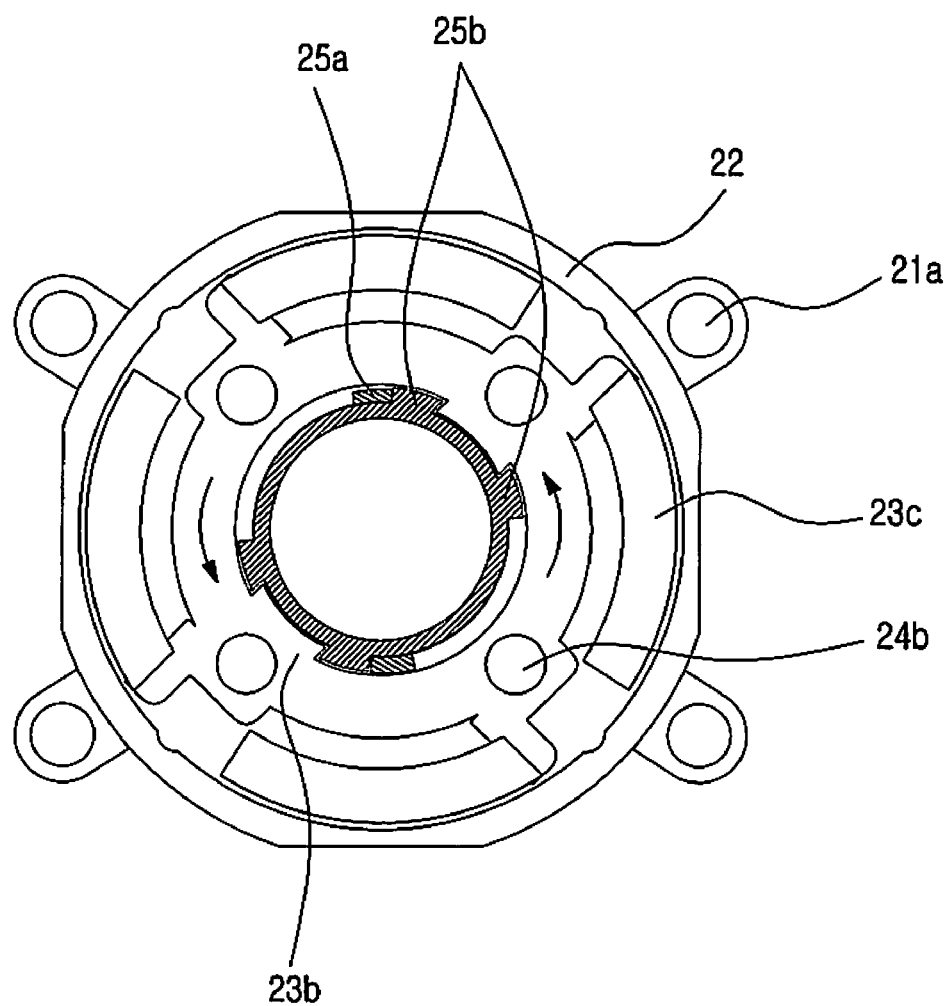
FIG. 18 is a cut plan view of a swing state of a second swing hinge unit of the hinge device in FIG. 17.

At the same time, as shown in FIG. 18, upon swinging of the second hinge member 22, the pair of contact members 25b of the second stopper unit 25 also swing, and the contact member 25b contacts the pair of contact protrusions 25a formed in the first hinge unit 21, thereby restricting a rotation of the second hinge member 22 to 90°.

As shown in FIG. 7, the rotation hinge unit 300 swings 90° by the first swing hinge unit 10 and the second swing hinge unit 20, thereby swinging the first hinge unit 310 from the latitudinal direction of the main body 100 to the longitudinal direction of the main body 100 and rotating the folder 200 from the main body 100 about the first hinge axis A1 of the first hinge unit 310 so that the folder 200 and the main body 100 are positioned side by side.

In this state, the user can conveniently use the terminal in the DMB mode, the game mode, and the QWERTY mode.

As shown in FIG. 9, the first swing hinge unit 10 is mounted in the main body 100 and the second swing hinge unit 20 is mounted in the folder 200.

In a hinge device of a dual-axis rotation folder-type mobile communication terminal according to another exemplary embodiment, the first hinge member 11, the second hinge member 12, the wave washer 13, and the stopper member 14 of the first swing hinge unit 10 can also be mounted in the folder 200.

The first swing hinge unit 10 can be mounted in both the main body 100 and the folder 200.

The first hinge member 21, the second hinge member 22, the swing washer 23, the first stopper member 24, and the second stopper member 25 of the second swing hinge unit 20 mounted in the folder 200 can also be mounted in the main body 100.

The second swing hinge unit 20 can be mounted in both the main body 100 and the folder 200.

As described above, according to the present invention, a hinge unit can rotate with a single swing operation to allow a folder open/closed state to be easily changed, thereby optimizing the user interface environment in which the user can easily perform a data input operation and conveniently view a displayed screen. Furthermore, in multimedia environments, the mobile communication terminal according to an embodiment of the present invention contributes to miniaturization while providing a user interface environment for convenient user data input.

While the invention has been shown and described with reference to preferred embodiments thereof, it will be understood by those skilled in the art that various changes in form and details may be made therein without departing from the spirit and scope of the invention.

What is claimed is:

1. A mobile communication terminal, comprising:
   a main body;
   a folder; and
   a rotation hinge unit connecting the folder to the main body so that the folder rotates about a first hinge axis in a direction towards or away from the main body, and the rotation hinge unit swings the first hinge axis a predetermined degree along the outer circumference of the main body in order to change a position of the first hinge axis,
   wherein the rotation hinge unit comprises a first rotation hinge unit connected to the main body and a second rotation hinge unit connected to the folder.

2. The mobile communication terminal of claim 1, wherein the main body has a first curvature region in a first corner of the main body and the folder has a second curvature region in a second corner of the folder corresponding to the first corner, and the rotation hinge unit swings along the outer circumferences of the first curvature region and the second curvature region in order to change a position of a first hinge axis.

3. The mobile communication terminal of claim 1, wherein the rotation hinge unit changes the first hinge axis between two positions respectively in a latitudinal direction and a longitudinal direction of the main body with a single swing operation.

4. The mobile communication terminal of claim 1, wherein the folder opens and closes entirely a top face of the main body.

5. A mobile communication terminal, comprising:
   a main body;
   a folder for opening and closing a top face of the main body by rotating about a first hinge axis, the first hinge axis having two positions respectively in a latitudinal direction and a longitudinal direction of the main body; and
   a rotation hinge unit for changing the first hinge axis between the two positions with a single swing operation,
   wherein the rotation hinge unit comprises a first rotation hinge unit connected to the main body and a second rotation hinge unit connected to the folder.

6. The mobile communication terminal of claim 5, wherein the main body and the folder have a first curvature region and a second curvature region, respectively.

7. The mobile communication terminal of claim 6, wherein the first curvature region and the second curvature region include a first moving recess and a second moving recess, respectively, in order to facilitate a swing of the rotation hinge unit.

8. A mobile communication terminal comprising:
   a main body including at least one key and a first curvature region;
   a folder including at least one display unit and a second curvature region, the folder rotatable about a first hinge axis having two positions respectively in a latitudinal direction and a longitudinal direction of the main body, thereby the folder being folded to and unfolded from the main body; and
   a rotation hinge unit connecting the folder to the main body so that the rotation unit swings the first hinge axis along the first curvature region and the second curvature region to be positioned in a first side of the main body and in a second side of the main body, the second side adjacent to the first side.

9. The mobile communication terminal of claim 8, wherein the first curvature region is formed in a corner of the main body.

10. The mobile communication terminal of claim 8, wherein the second curvature region is formed in a corner of the folder.

11. The mobile communication terminal of claim 8, wherein the rotation hinge unit comprises:
   a first hinge unit that is spaced apart from the main body and provides the first hinge axis;
   a second hinge unit providing a second hinge axis that perpendicularly penetrates a top and a bottom faces of the main body and a top and a bottom faces of the folder; and
   a swing connection member connecting the first hinge unit with the second hinge unit as one body.

12. The mobile communication terminal of claim 11, wherein the second hinge unit comprises:
   a first swing hinge module mounted on the bottom face of the main body; and
   a second swing hinge module mounted on the top face of the folder.

13. The mobile communication terminal of claim 11, wherein the swing connection member comprises:
   a first swing connection member rotatable about the second hinge axis while facing the bottom face of the main body; and
   a second swing connection member rotatable about the second hinge axis while facing the top face of the folder.

14. The mobile communication terminal of claim 8, further comprising:
   a first moving recess formed in a bottom face of the main body in which the first curvature region is positioned; and
   a second moving recess formed in a top face of the folder in which the second curvature region is positioned.

15. The mobile communication terminal of claim 8, wherein the at least one display unit comprises:
   a first display unit mounted on an outer face of the folder; and
   a second display unit mounted on an inner face of the folder.

16. The mobile communication terminal of claim 8, wherein the at least one key comprises a plurality of keys arranged in a QWERTY key layout.

17. A mobile communication terminal comprising:
   a data input device including a first curvature region;
   a data output device including a second curvature region, the data output device rotatable about a first hinge axis having two positions respectively in a latitudinal direction and a longitudinal direction of the data input device, thereby the data output device being folded to or unfolded from the data input device; and
   a rotation hinge unit connecting the data output device to the data input device so that the data output device rotates towards and away from the data input device, and the rotation unit swings the first hinge axis along the first curvature region and the second curvature region to be positioned in a first side of the data input device and in a second side of the data input device, the second side adjacent to the first side.

18. The mobile communication terminal 17, wherein a first moving recess is formed in a bottom face of the data input device in which the first curvature region is positioned and a second moving recess is formed in a top face of the data output device in which the second curvature region is positioned in order to facilitate rotation of the rotation hinge unit.

19. The mobile communication terminal of claim 17, wherein the data output device comprises:

a first display unit mounted on an outer face of the data output device; and a second display unit mounted on an inner face of the data output device.

20. A mobile communication terminal comprising:

a hinge device of a dual-axis rotation folder-type mobile communication terminal including a main body, a folder, a rotation hinge unit having a first hinge unit that swings along the outer circumference of the main body and provides a first hinge axis having two positions respectively in a latitudinal direction and a longitudinal direction of the main body according to a swing of the rotation hinge unit, a second hinge unit that perpendicularly penetrates a top face and a bottom face of the main body and a top face and a bottom face of the folder, and a swing connection member that connects the first hinge unit with the second hinge unit as one body, the hinge device comprising:

a second swing hinge unit mounted on the folder, swinging about the first hinge axis, and providing a third hinge axis; and a first swing hinge unit mounted on the main body, swinging about the first hinge axis, and providing a second hinge axis.

21. The mobile communication terminal of claim 20, wherein the first swing hinge unit comprises:

a first hinge member;

a second hinge member combined with the first hinge member so as to swing while facing the first hinge member;

a wave washer provided between the first hinge member and the second hinge member, enabling the second hinge member to swing while facing the first hinge member, and providing an elastic force for enabling the rotation hinge unit to swing; and a stopper member disposed between the first hinge member and the wave washer and inserted to or separated from the first hinge member by the elastic force in order to enable or restrict a swing of the second hinge member.

22. The hinge device of claim 21, wherein the first hinge member comprises:

at least one first engagement unit engaged with the main body; and at least one insertion/separation unit formed at equiangular intervals around the center portion of the first hinge member in the bottom face of the first hinge member, and further wherein the second hinge member comprises:

at least one second engagement unit engaged with the rotation hinge unit; and a support member extending from the circumference of the second hinge member.

23. The hinge device of claim 21, further comprising a swing bush sequentially combining the first hinge member and the second hinge member and the stopper member and swinging the second hinge member and the stopper member during a swing of the rotation hinge unit.

24. The hinge device of claim 23, wherein the stopper member comprises:

a through hole formed in the center of the stopper member and combined with the swing bush through the swing bush; and at least one guide stopper groove formed at equiangular intervals along the circumference of the through hole and moving in contact with an insertion/separation unit formed on a bottom face of the first hinge member to be inserted to or separated from the at least one guide stopper groove, thereby restricting swings of the second hinge member and the stopper member.

25. The hinge device of claim 21, wherein the stopper member comprises a guide face guiding a swing of the stopper member during a swing of the rotation hinge unit.

26. The hinge device of claim 20, wherein the second swing hinge unit includes the first swing hinge unit.

27. A mobile communication terminal comprising:

a hinge device of a dual-axis rotation folder-type mobile communication terminal including a main body, a folder, a rotation hinge unit having a first hinge unit that swings along the outer circumference of the main body and provides a first hinge axis having two positions respectively in a latitudinal direction and a longitudinal direction of the main body according to a swing of the first hinge unit, a second hinge unit, that perpendicularly penetrates a top face and a bottom face of the main body and a top face and a bottom face of the folder, and a swing connection member that connects the first hinge unit with the second hinge unit as one body, the hinge device comprising:

a first swing hinge unit mounted on the main body, swinging about the first hinge axis, and providing a second hinge axis; and a second swing hinge unit mounted on the folder, swinging about the first hinge axis, and providing a third hinge axis.

28. The mobile communication terminal of claim 27, wherein the second swing hinge unit comprises:

a first hinge member;

a second hinge member combined with the first hinge member so as to swing while facing the first hinge member;

a swing washer provided between the first hinge member and the second hinge member, enabling the second hinge member to swing while facing the first hinge member, and providing an elastic force for enabling the rotation hinge unit to rotate; and a first stopper unit and a second stopper unit, both the stopper units disposed between the first hinge member and the second hinge member, and enabling and restricting a swing of the second hinge member respectively by detachment and contact.

29. The hinge device of claim 28, wherein the first hinge member comprises at least one first engagement unit engaged with the folder, and the second hinge member comprises at least one second engagement unit engaged with the rotation hinge unit.

30. The hinge device of claim 29, wherein the second engagement unit comprises a screw hole and at least one combining protrusion formed adjacent to the screw hole in order to be combined with a hole formed in the rotation hinge unit.

31. The hinge device of claim 28, wherein the swing washer comprises:

a combining hole formed at the center portion of the swing washer;

a pair of combination fixing unit formed in an inner side of the combining hole in order to be combined with a fixing groove formed in an internal face of the second hinge member and to swing together with the swing washer during a rotation of the second hinge member; and at least one elastic substance formed at equiangular intervals along an outer circumference of the combining hole in order to provide an elastic force for enabling the second hinge member to swing.

32. The hinge device of claim 31, wherein the elastic substance is made of a pan spring, one end of the pan spring is a fixing end in order to be fixed in the swing washer and another end of the pan spring is a free end in order to protrude a predetermined height in a direction of the second hinge axis.

33. The hinge device of claim 28, wherein the first stopper unit comprises:
   at least one stopper protrusion formed at equiangular intervals along the circumference of the through hole formed in the first hinge member; and
   at least one stopper groove formed in the swing washer in a position corresponding to a position of the stopper protrusion and separated from the stopper protrusion by rotating during swings of the second hinge member and the swing washer.

34. The hinge device of claim 28, wherein the second stopper unit comprises:
   a pair of contact protrusions formed in the through hole of the first hinge member; and
   a pair of stopper contact members formed in the inner side of the second hinge member, provided in a position that can contact the contact protrusions, contact the contact protrusions by rotating during a swing of the second hinge member in order to restrict the swing of the second hinge member.

35. The hinge device of claim 27, wherein the first swing hinge unit includes the second swing hinge unit.

36. A mobile communication terminal comprising;
   a hinge device of a dual-axis rotation folder-type mobile communication terminal including a main body, a folder, a rotation hinge unit having a first hinge unit that swings along the outer circumference of the main body and provides a first hinge axis having two positions respectively in a latitudinal direction and a longitudinal direction of the main body according to a swing of the first hinge unit, a second hinge unit that perpendicularly penetrates a top and a bottom faces of the main body and a top and a bottom faces of the folder and a swing connection member that connects the first hinge unit with the second hinge unit as one body, the hinge device comprising:
   a first swing hinge unit mounted on the main body, the first swing hinge unit swinging about the first hinge axis and providing a second hinge axis; and
   a second swing hinge unit mounted on the folder, the second swing hinge unit swinging about the first hinge axis and providing a third hinge axis.

* * * * *